(12) United States Patent
Han et al.

(10) Patent No.: US 9,591,354 B2
(45) Date of Patent: Mar. 7, 2017

(54) TELEVISION VOLUME CONTROL METHOD AND SYSTEM

(71) Applicant: BOE TECHNOLOGY GROUP CO., LTD., Beijing (CN)

(72) Inventors: Yang Han, Beijing (CN); Shuo Chen, Beijing (CN); Yanfu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 5 days.

(21) Appl. No.: 14/436,232

(22) PCT Filed: Aug. 26, 2014

(86) PCT No.: PCT/CN2014/085205
§ 371 (c)(1),
(2) Date: Apr. 16, 2015

(87) PCT Pub. No.: WO2015/165180
PCT Pub. Date: Nov. 5, 2015

(65) Prior Publication Data
US 2016/0182944 A1 Jun. 23, 2016

(30) Foreign Application Priority Data

Apr. 30, 2014 (CN) .......................... 2014 1 0181442

(51) Int. Cl.
*H04N 5/60* (2006.01)
*H04N 5/63* (2006.01)
(Continued)

(52) U.S. Cl.
CPC ........... *H04N 21/4396* (2013.01); *H04N 5/60* (2013.01); *H04N 21/4223* (2013.01);
(Continued)

(58) Field of Classification Search
CPC ............... H04N 5/60; H04N 21/42203; H04N 21/4396; H04N 21/4394; H04N 21/44218;
(Continued)

(56) References Cited

U.S. PATENT DOCUMENTS 5,528,316 A * 6/1996 Lee ........................... H04N 5/60
348/738
5,862,236 A * 1/1999 Haas ...................... H03G 3/348
381/107
(Continued)

FOREIGN PATENT DOCUMENTS

CN 101005588 A 7/2007
CN 101442636 A 5/2009
(Continued)

OTHER PUBLICATIONS

International Search Report of PCT/CN2014/085205 in Chinese with English translation, mailed Jan. 30, 2015.
(Continued)

*Primary Examiner* — Sherrie Hsia
(74) *Attorney, Agent, or Firm* — Collard & Roe, P.C.

(57) ABSTRACT

A television volume control method and system are provided. According to the television volume control method, a television performs a process of a mutely turn-on mode after receiving a turn-on instruction, the process of the mutely turn-on mode comprising: acquiring a system time and determining whether the system time is within a preset rest time period or not; and the television being turned on mutely if it is determined to be within the preset rest time period, and being turned on normally if it is determined to be not within the preset rest time period. The problem of disturbing others due to a sound with a large volume being output suddenly when the TV is turned on is solved.

16 Claims, 3 Drawing Sheets

(51) Int. Cl.
  *H04N 21/439* (2011.01)
  *H04N 21/422* (2011.01)
  *H04N 21/4223* (2011.01)
  *H04N 21/442* (2011.01)
  *H04N 21/485* (2011.01)

(52) U.S. Cl.
  CPC ... *H04N 21/42203* (2013.01); *H04N 21/4394* (2013.01); *H04N 21/44218* (2013.01); *H04N 21/4852* (2013.01)

(58) Field of Classification Search
  CPC ........ H04N 5/505; H03G 3/348; H03G 3/345; H03G 3/32; H03G 3/34; H03F 1/305
  USPC ....... 348/730, 725, 738, 632; 381/94.5, 104, 381/105, 107; 455/194.1
  IPC .............................. H04N 5/60,5/44, 3/24, 5/63
  See application file for complete search history.

(56) References Cited

U.S. PATENT DOCUMENTS

| | | | | |
|---|---|---|---|---|
| 6,055,023 A | * | 4/2000 | Rumreich | H04N 5/44513 348/553 |
| 2006/0050899 A1 | * | 3/2006 | Hsieh | H03G 3/04 381/107 |
| 2009/0169023 A1 | | 7/2009 | Wang | |

FOREIGN PATENT DOCUMENTS

| | | |
|---|---|---|
| CN | 101471635 A | 7/2009 |
| CN | 101626453 A | 1/2010 |
| CN | 102111591 A | 6/2011 |
| CN | 102377965 A | 3/2012 |
| CN | 102404614 A | 4/2012 |
| CN | 102769704 A | 11/2012 |
| CN | 103986891 A | 8/2014 |
| JP | 2010-268284 A | 11/2010 |

OTHER PUBLICATIONS

Notice of Transmittal of the International Search Report PCT/CN2014/085205 in Chinese, mailed Jan. 30, 2015.
Written Opinion of the International Searching Authority of PCT/CN2014/085205 in Chinese with English translation, mailed Jan. 30, 2015.
Chinese Office Action in Chinese Application No. 201410181442.0, mailed Nov. 18, 2016 with English translation.

* cited by examiner

TELEVISION VOLUME CONTROL METHOD AND SYSTEM

CROSS REFERENCE TO RELATED APPLICATIONS

This application is the National Stage of PCT/CN2014/085205 filed on Aug. 26, 2014, which claims priority under 35 U.S.C. §119 of Chinese Application No. 201410181442.0 filed on Apr. 30, 2014, the disclosure of which is incorporated by reference.

TECHNICAL FIELD OF THE DISCLOSURE

The present disclosure relates to a television volume control method and system.

BACKGROUND

The television (TV) has gradually become essential household entertainment equipment due to its distinct advantages since it was developed. However, such phenomenon often occurs in real life, in which a sound with a large volume is output suddenly when the TV is turned on and other people may be disturbed. When the viewer is watching TV, he or she cannot hear the sound of the TV clearly since the surrounding noise is too loud. Alternatively, when multiple people are chatting and no one is watching TV, the sound of the TV may affect the chat. At this time, the viewer needs to search a remote controller everywhere or to come up to the TV to adjust the volume.

SUMMARY

A television volume control method and system are provided in at least one embodiment of the present disclosure, which can solve the problem of disturbing others due to a sound with a large volume being output suddenly when the TV is turned on.

In at least one embodiment of the present disclosure, a television volume control method is provided, wherein a television performs a process of a mutely turn-on mode after receiving a turn-on instruction, the process of the mutely turn-on mode comprising: acquiring a system time and determining whether the system time is within a preset rest time period or not; and the television being turned on mutely if it is determined to be within the preset rest time period, and being turned on normally if it is determined to be not within the preset rest time period.

Optionally, the television volume control method further comprises: before the television performs the process of the mutely turn-on mode and after the television receives the turn-on instruction, determining whether to enter the mutely turn-on mode or not, based on a user-input instruction or on a user's presetting; and the television continuing to perform the process of the mutely turn-on mode if it is determined to be yes, and being turned on normally and directly if it is determined to be no.

The television volume control method further comprises: performing a process of an automatic volume control mode after the television is turned on, the process of the automatic volume control mode comprising:
determining whether there is someone watching the television or not;
decreasing a volume output by the television if no one is watching the television;
capturing a surrounding sound firstly and then determining whether the volume output by the television exceeds a volume of the surrounding sound by a preset value or not, if someone is watching the television; and adjusting the volume output by the television until the volume by which the volume output by the television exceeds the volume of the surrounding sound reaches the preset value, if it is determined to be no.

Optionally, the television volume control method further comprises: before performing the process of the automatic volume control mode and after the television is turned on, determining whether to enter the automatic volume control mode or not, based on a user-input instruction or on a user's presetting, and the television continuing to perform the process of the automatic volume control mode if it is determined to be yes, and being played with a constant volume if it is determined to be no.

Optionally, in the process of the automatic volume control mode, the volume output by the television is decreased below 15 dB if no one is watching the television.

Optionally, the preset value is larger than or equal to 5 dB.

In another aspect, a television volume control system is further provided in at least one embodiment of the present disclosure, comprising:
an acquiring unit operative to acquire system time when a television receives a turn-on instruction and works in a mutely turn-on mode;
a first determining unit operative to determine whether the acquired system time is within a preset rest time period or not; and
a turning on unit operative to turn on the television mutely if it is determined that the system time is within the preset rest time period, and to turn on the television normally if it is determined that the system time is not within the preset rest time period.

Further, the television volume control system further comprises:
a camera apparatus operative to capture a picture in front of the television in real time after the television is turned on and works in an automatic volume control mode;
an identification unit operative to identity the picture captured by the camera apparatus to determine whether there is someone watching the television or not;
a sound sensor operative to capture a surrounding sound;
a second determining unit operative to determine whether a volume output by the television exceeds a volume of the surrounding sound by a preset value or not; and
a volume control unit operative to decrease the volume output by the television if no one is watching the television, and to adjust the volume output by the television until the volume by which the volume output by the television exceeds the volume of the surrounding sound reaches the preset value, if there is someone watching the television and a determination result of the second determining unit is no.

Optionally, the television volume control system further comprises: a mode entering unit operative to determine whether to enter the mutely turn-on mode or not, based on a user-input instruction or on a user's presetting, after the television receives the turn-on instruction and before the television enters the mutely turn-on mode; and further operative to determine whether to enter the automatic volume control mode or not, based on a user-input instruction or on a user's presetting, after the television is turned on and before the television enters the automatic volume control mode.

The television volume control method and system provided in at least one embodiment of the present disclosure determine whether to perform the process of mutely turn-on or not by determining whether it is within the preset rest time period or not, thereby avoiding a sound with a large volume being output suddenly and disturbing others when the TV is turned on. Further, the television volume control method and system provided in the embodiments of the present disclosure determines whether to perform the volume optimization or not, by determining whether there is someone watching TV or not and the situation of the surrounding sound, thereby realizing an optimal sound effect of the TV, and preventing the volume from being too large, so as to achieve the function of decreasing power consumption and protecting the environment.

BRIEF DESCRIPTION OF THE DRAWINGS

Hereinafter, in order to describe the technical solutions in the embodiments of the present disclosure more clearly, the accompany drawings necessary to be used in the embodiments will be introduced briefly. Apparently, the accompany drawings in the following description only exemplify some embodiments of the present disclosure. For those of ordinary skill in the art, other accompany drawings may also be derived from these accompany drawings without any inventive labor.

DETAILED DESCRIPTION

Hereinafter, the technical solutions in the embodiments of the present disclosure will be described clearly and thoroughly with reference to the accompany drawings.

First Embodiment

Figure 1:
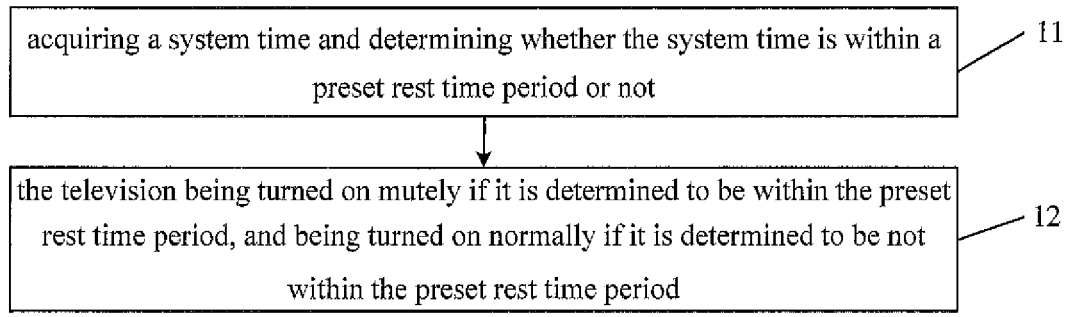
FIG. 1 is a flowchart of a mutely turn-on mode in a first embodiment of the present disclosure.

FIG. 1 is a flowchart of a mutely turn-on mode in a first embodiment of the present disclosure. A TV volume control method is provided in the first embodiment of the present disclosure, in which the TV performs a process of a mutely turn-on mode after receiving a turn-on instruction. As shown in FIG. 1, the process of the mutely turn-on mode comprises the following steps.

11: A system time is acquired and it is determined whether the system time is within a preset rest time period or not.

12: The TV is turned on mutely if it is determined to be within the preset rest time period, and is turned on normally if it is determined to be not within the preset rest time period.

Since it is quiet in the surroundings during nighttime (which is one of the application scenarios) and there are less people watching TV, the sound of the TV is often very loud when the TV is turned on. In order not to affect other people to rest, the system clock of the TV is adopted as a reference for controlling the volume in the present embodiment. The effect on other people is alleviated by decreasing the start volume in a special time period (i.e., the preset rest time period described above). In the present embodiment, the preset rest time period may be 12:00 p.m.-14:00 p.m. at noon and 22:00 p.m.-7:00 a. m. in the evening by default, and may be defined by the user according to the actual situation.

The start-sound operation in the mutely turn-on mode is as follows. If the turn-on time is within the preset rest time period, a sound with 0 (or a small value) db is output initially when the TV is turned on, and then the user may change the magnitude of the volume of the output sound according to the actual situation after the TV is turned on. In this way, for example, when the user needs to watch a football game during the nighttime or to watch TV at noon when the family is at rest, the sound when the TV is turned on won't disturb the family. It is to be noted that the mutely turn-on described in the present embodiment means a sound with 0 dB or a small value of dB being output when the TV is turned on, and does not mean the 0 dB exclusively. If the turn-on time is not within the preset rest time period, the TV is turned on normally which is the same as in the known solutions, and will not be described here repeatedly.

Optionally, before the TV performs the process of the mutely turn-on mode and after receiving a turn-on instruction, the method may further comprise determining whether to enter the mutely turn-on mode or not based on a user-input instruction or on a user's presetting. It continues to perform the process of the mutely turn-on mode if it is determined to be yes, and the TV is turned on normally and directly if it is determined to be no. In the present embodiment, whether to enter the mutely turn-on mode may be selected by users according to a user-input instruction or a user's presetting.

Figure 2:
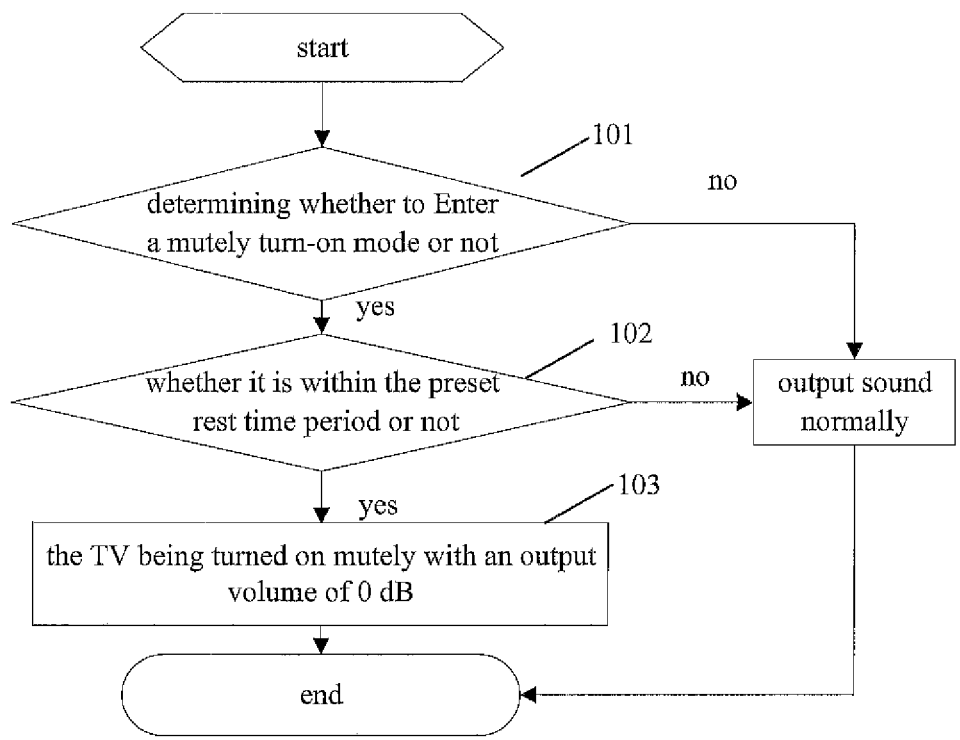
FIG. 2 is a detailed process of the mutely turn-on performed in the first embodiment of the present disclosure.

FIG. 2 is a detailed process of the mutely turn-on performed in the first embodiment of the present disclosure. The TV performs the process after receiving the turn-on instruction. As shown in FIG. 2, the process comprises the following steps.

101: It is determined whether to enter the mutely turn-on mode or not. If enters, it continues to perform a step 102. If not, the TV is turned on normally, and the sound is output normally, generally with a default value or a setting value when the TV is turned off the last time.

102: It is determined whether the system time is within the preset rest time period or not. If it is, it continues to perform a step 103. If it is not, the TV is turned on normally, and the sound is output normally.

103: The TV is turned on mutely with the output volume of 0 dB.

Figure 3:
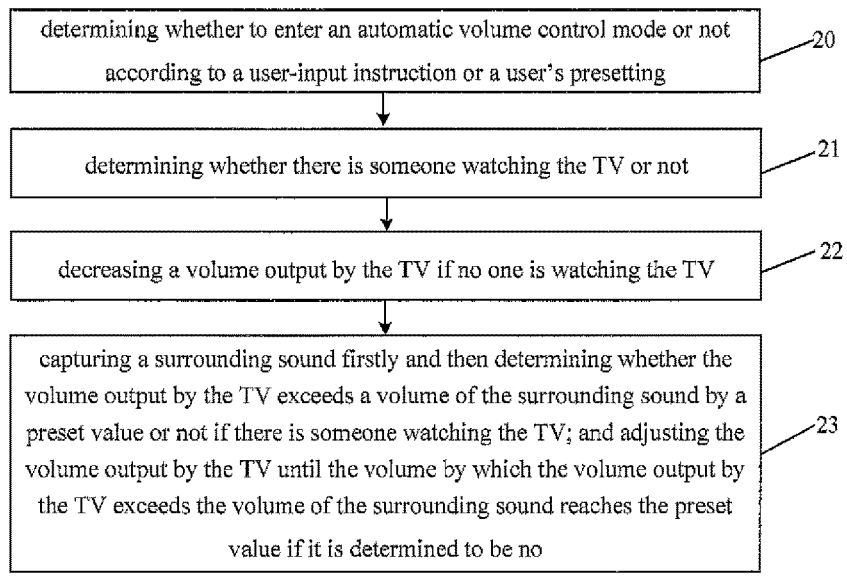
FIG. 3 is a flowchart of an automatic volume control mode in the first embodiment of the present disclosure.

FIG. 3 is a flowchart of an automatic volume control mode in the first embodiment of the present disclosure. Further, the TV volume control method described in the present embodiment further comprise performing the process of the automatic volume control mode after the TV is turned on. As shown in FIG. 3, the process of the automatic volume control mode comprises the following steps.

21: It is determined whether there is someone watching TV or not.

There are many implementations for the above determination in the known solutions, such as an image recognition technology, an infrared ray scan or the like, and will not be described here in detail.

22: A volume output by the TV is decreased if no one is watching the TV.

For example, in the process of the automatic volume control mode, if no one is watching the TV, the volume output by the TV is decreased so as to achieve the purpose of decreasing the power consumption and protecting the environment. For example, it may be decreased below 15 dB.

23: A surrounding sound is captured firstly and then it is determined whether the volume output by the TV exceeds the volume of the surrounding sound by a preset value or not if someone is watching the TV. If it is determined to be no, the volume output by the TV is adjusted until the volume by which the volume output by the TV exceeds the volume of the surrounding sound reaches the preset value. In the present embodiment, the preset value may be an empirical value or may be adjusted according to the actual situation, taken the viewer being capable of hearing the TV play sound clearly under the background of a surrounding sound as standard. Generally, in the present embodiment, the preset value is larger than or equal to 5 dB, and is preferably 5 dB, which can assure that the viewer hears the TV play sound clearly, and can prevent the volume from being too large, so as to decrease the power consumption and protection the environment.

Further, optionally, the method may comprise the following step before performing the process of the automatic volume control mode and after the TV is turned on.

20: It is determined whether to enter the automatic volume control mode or not based on a user-input instruction or on a user's presetting. It continues to perform the process of the automatic volume control mode if it is determined to be yes, and the TV is played with a constant volume if it is determined to be no. In the present embodiment, whether to enter the automatic volume control mode or not may be selected according to a user-input instruction or a user's presetting. For example, if the user inputs an instruction for entering the automatic volume control mode through a remote controller, the system performs the steps 21-23 automatically. The output volume is optimized and adjusted in real time according to whether there is someone watching the TV and the situation of the surrounding sound, so as to realize the best sound effect when watching TV, and to achieve the function of decreasing the power consumption and protecting the environment.

Figure 4:
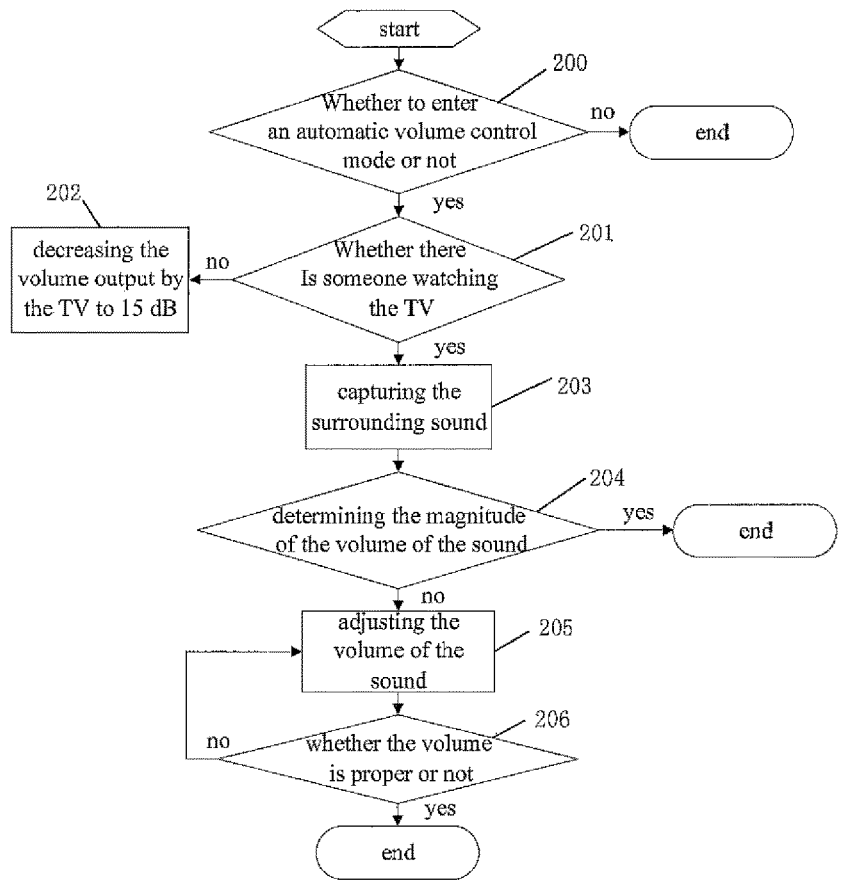
FIG. 4 is a detailed process of the automatic volume control performed in the first embodiment of the present disclosure.

FIG. 4 is a detailed process of the automatic volume control performed in the first embodiment of the present disclosure. As shown in FIG. 4, the process comprises the following steps.

200: It is determined whether to enter the automatic volume control mode or not according to a user-input instruction or a user's presetting. If it is determined to be yes, it continues to perform a step 201. If it is determined to be no, the TV is played with a constant volume.

201: It is determined whether there is someone watching the TV or not. If it is determined to be yes, a step 203 is performed. If it is determined to be no, a step 202 is performed, and the volume output by the TV is decreased blow 15 dB.

202: The volume output by the TV is decreased below 15 dB.

203: The surrounding sound is captured.

204: The magnitude of the volume of the sound is determined. It is determined whether the volume output by the TV exceeds the volume of the surrounding sound by a preset value or not. If it is determined to be no, a step 205 is performed. If it is determined to be yes, the process ends.

205: The volume is adjusted.

206: It is determined whether the adjusted volume is proper or not, i.e., whether it exceeds the volume of the surrounding sound by the preset value or not. If it is determined to be no, it continues to perform the step 205, and the magnitude of the volume output by the TV is adjusted. If it is determined to be yes, the process ends.

It is to be noted that the surrounding sound and whether there is someone watching TV are monitored in real time, and the volume output by the TV is optimized and adjusted according to the monitoring result in the present embodiment. That is, the steps of 201 to 206 described above are performed in cycle. As long as the TV works in the automatic volume control mode, the following functions may be achieved. If someone is watching the TV, the TV volume is adjusted by comparing the volumes of the surrounding sound and the TV sound, and a volume (empirical value, adjustable) which exceeds the volume of the surrounding sound by the preset value, such as 5 dB, is output finally. If no one is watching the TV, the volume of the output sound is decreased below 15 dB (minimum value of mutter, adjustable) until someone is watching the TV, and the optimal volume is recovered.

In the TV volume control method described in the present embodiment, the mutely turn-on is realized in the special time period, and the output volume is optimized and adjusted in real time according to the watching situation of the viewer and the magnitude of the volume of the surrounding sound during watching, thereby solving the problem of how to adjust the TV volume intelligently, realizing an optimal sound effect when watching TV, and achieving a purpose of decreasing the power consumption and protecting the environment.

Second Embodiment

Figure 5:
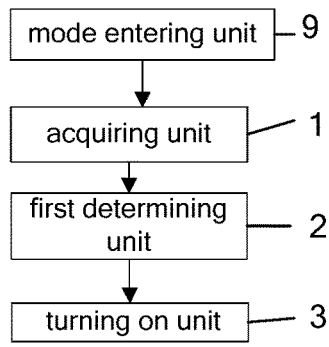
FIG. 5 is a structural block diagram of a TV volume control system provided in a second embodiment of the present disclosure.

In another aspect, a TV volume control system is further provided in an embodiment of the present disclosure. FIG. 5 is a structural block diagram of a TV volume control system provided in a second embodiment of the present disclosure. As shown in FIG. 5, the system comprises: an acquiring unit 1 operative to acquire a system time when a turn-on instruction is received by a TV and the TV works in a mutely turn-on mode; a first determining unit 2 operative to determine whether the acquired system time is within a preset rest time period or not; and a turning on unit 3 operative to turn on the TV mutely if it is determined that the system time is within the preset rest time period, and to turn on the TV normally if it is determined that the system time is not within the preset rest time period.

In a particular implementation, the system time may be acquired by an internal clock of the TV system. The smart chip in the TV system determines whether the acquired system time is within the preset rest time period or not. If it is, a mutely turn-on instruction is generated. That is, the volume output by the TV is set at 0 (or a small value) dB when the TV is turned on. In this way, for example, when the user needs to watch a football game during the nighttime or to watch TV at noon when the family is at rest, the sound when the TV is turned on won't disturb the family.

Figure 6:
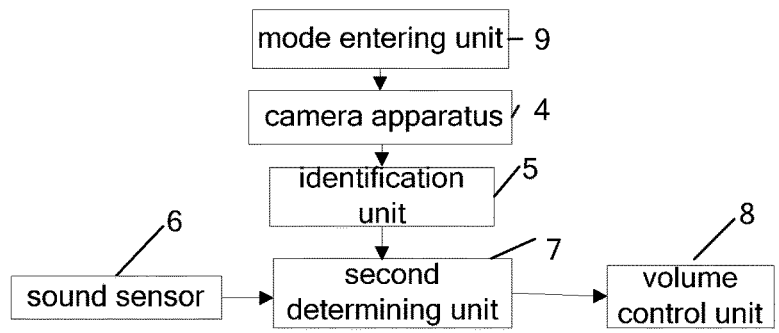
FIG. 6 is a further structural block diagram of the TV volume control system provided in the second embodiment of the present disclosure.

FIG. 6 is a further structural block diagram of the TV volume control system provided in the second embodiment of the present disclosure. As shown in FIG. 6, the TV volume control system further comprises a camera apparatus 4 operative to capture a picture in front of the TV in real time after the TV is turned on and works in an automatic volume control mode; an identification unit 5 operative to identify the picture captured by the camera apparatus 4 to determine whether there is someone watching the TV; a sound sensor 6 operative to capture a surrounding sound; a second determining unit 7 operative to determine whether the volume output by the TV exceeds the volume of the surrounding sound by a preset value or not; and a volume control unit 8 operative to decrease the volume output by the TV if no one is watching the TV, and to adjust the volume output by the TV until the volume by which the volume output by the TV exceeds the volume of the surrounding sound reaches the preset value, if someone is watching the TV and a determination result of the second determining unit 7 is no.

Optionally, the TV volume control system further comprises a mode entering unit (not shown) operative to determine whether to enter the mutely turn-on mode or not based on a user-input instruction or on a user's presetting, after the TV receives the turn-on instruction and before entering the mutely turn-on mode; and further operative to determine whether to enter the automatic volume control mode or not based on a user-input instruction or on a user's presetting, after the TV is turned on and before entering the automatic volume control mode.

The functions of the acquiring unit 1, the first determining unit 2, the identification unit 5 and the second determining unit 7 described above may be realized by a smart chip within the TV system. Hereinafter, in order for those skilled in the art to better understand the TV volume control system provided in the embodiment of the present disclosure, the TV volume control system provided in the present disclosure will be described in detail by way of particular embodiments.

Figure 7:
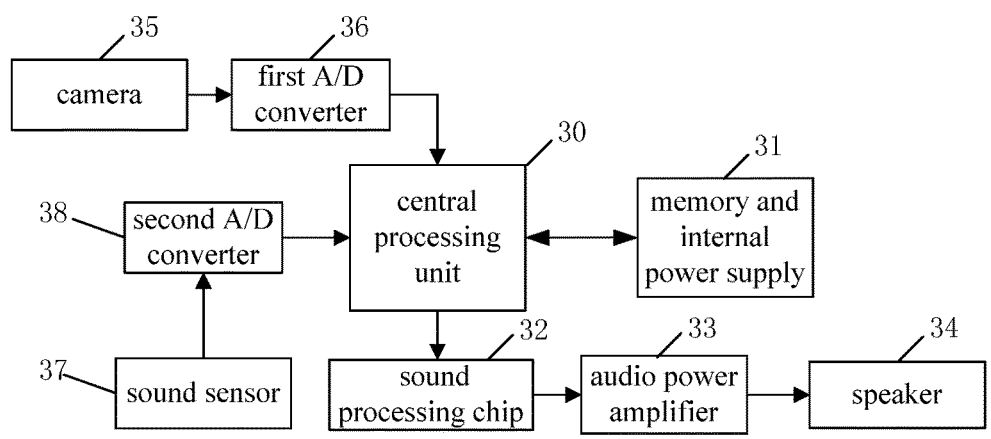
FIG. 7 is a hardware block diagram of the TV volume control system provided in the second embodiment of the present disclosure.

FIG. 7 is a hardware block diagram of the TV volume control system provided in the second embodiment of the present disclosure. As shown in FIG. 7, the current TV system comprises a Central Processing Unit (CPU) 30, a memory and an internal power supply 31. The devices related to the play of the sound comprise a sound processing chip 32, an audio power amplifier 33 and a speaker 34, wherein the sound processing chip 32 works under an instruction of the CPU 30 to process a sound signal which is then transmitted to the audio power amplifier 33 to be amplified and finally played through the speaker 34.

The TV volume control system provided in the embodiment of the present disclosure, with combination of the system clock built within the TV, realizes the function of a mutely turn-on in the preset rest time period by providing a reference for adjustment of the volume to the devices related to the play of the sound. For example, first, after receiving the turn-on instruction, the CPU 30 determines the user-input instruction or the user's presetting, and selects whether to enter the mutely turn-on mode. In the mutely turn-on mode, the CPU 30 refers to the system clock built within the TV to determine whether it is within the preset rest time period or not at that time. If it is determined to be within the preset rest time period, the CPU 30 generates a turn-on instruction and instructs the devices related to the play of the sound to be mute (which may be implemented in various ways and may be set by those skilled in the rat according to actual situation). As a result, the TV is turn on mutely. If it is determined to be not within the preset rest time period, the TV is turned on normally.

Further, the TV volume control system provided in the embodiment of the present disclosure adds a camera 35 and a first analog/digital converter (i.e., A/D converter) 36 in the front of the TV on the basis of the current TV system. The CPU 30 realizes the image recognition, and further determines whether there is someone watching the TV or not, and thereby provides a reference for adjusting the volume to the devices related to the play of the sound. If no one is watching the TV, the volume output by the TV is decreased. In addition, the TV volume control system provided in the embodiment of the present disclosure is further provided with a sound sensor 37 and a second analog/digital converter (i.e., A/D converter) 38 for obtaining the magnitude of the volume of the surrounding sound, and thereby provides a reference for adjusting the volume to the devices related to the play of the sound when someone is watching the TV. If someone is watching the TV, the CPU 30 determines whether the volume of the TV exceeds the surrounding volume by the preset value or not. If it is determined to be no, the sound processing chip 32, the audio power amplifier 33 and the speaker 34 are reset or adjusted under the control of the CPU 30, and finally make the TV output a sound with proper volume. Finally, the optimal sound effect when watching TV is realized, and the purpose of decreasing the power consumption and protecting the environment is achieved.

It may be understood that the present disclosure is not limited to be applied to the TV, and may also be applied to all scenarios requiring a control of the volume.

The embodiments of the present disclosure are described progressively, the same or like part between the embodiments may refer to each other, and the emphasis of each embodiment is its difference from the other embodiments. Especially, for the device embodiments, since they are substantially similar to the method embodiments, they are described briefly, and the related parts may refer to the description of the method embodiments.

Those of ordinary skill in the art may understand that all or part of the processes in the method embodiments described above may be realized by related hardware instructed by a computer program which may be stored in a computer readable storage medium and may comprise the processes of the method embodiments when being executed. The storage medium may be a magnetic disk, an optical disk, a Read-Only Memory or a Random Access Memory, or the like.

The above descriptions are only particular implementations of the present disclosure, and the protection scope of the present disclosure is not limited thereto. Any change or substitution which may be conceivable easily by those skilled in the art within the technical scope disclosed by the present disclosure shall fall within the protection scope of the present disclosure. Therefore, the protection scope of the present disclosure should be defined by the protection scope of the claims.

The present application claims a priority of a Chinese patent application no. 201410181442.0 filed on Apr. 30, 2014, the content of which is incorporated herein entirely by reference as a part of the present application.

What is claimed is:

1. A television volume control method, wherein the method comprises performing a process of a mutely turn-on mode by a television after receiving a turn-on instruction, the process of the mutely turn-on mode comprising:
   acquiring a system time and determining whether the system time is within a preset rest time period or not;
   the television being turned on mutely if it is determined to be within the preset rest time period, and being turned on normally if it is determined to be not within the preset rest time period
   the television volume control method further comprising:
   performing a process of an automatic volume control mode after the television is turned on, the process of the automatic volume control mode comprising:

determining whether there is someone watching the television or not;

decreasing a volume output by the television if no one is watching the television;

capturing a surrounding sound firstly and then determining whether the volume output by the television exceeds a volume of the surrounding sound by a preset value or not, if someone is watching the television; and adjusting the volume output by the television until the volume by which the volume output by the television exceeds the volume of the surrounding sound reaches the preset value, if it is determined to be no.

2. The television volume control method according to claim 1, wherein before the television performs the process of the mutely turn-on mode and after the television receives the turn-on instruction, the method further comprising:

determining whether to enter the mutely turn-on mode or not, based on a user-input instruction or on a user's presetting; and the television continuing to perform the process of the mutely turn-on mode if it is determined to be yes, and being turned on normally and directly if it is determined to be no.

3. The television volume control method according to claim 2, before performing the process of the automatic volume control mode and after the television is turned on, the method further comprising:

determining whether to enter the automatic volume control mode or not, based on a user-input instruction or on a user's presetting; and the television continuing to perform the process of the automatic volume control mode if it is determined to be yes, and being played with a constant volume if it is determined to be no.

4. The television volume control method according to claim 3, wherein in the process of the automatic volume control mode, the volume output by the television is decreased below 15 dB if no one is watching the television.

5. The television volume control method according to claim 4, wherein the preset value is larger than or equal to 5 dB.

6. The television volume control method according to claim 3, wherein the preset value is larger than or equal to 5 dB.

7. The television volume control method according to claim 2, wherein the preset value is larger than or equal to 5 dB.

8. The television volume control method according to claim 1, wherein before performing the process of the automatic volume control mode and after the television is turned on, the method further comprising:

determining whether to enter the automatic volume control mode or not, based on a user-input instruction or on a user's presetting; and the television continuing to perform the process of the automatic volume control mode if it is determined to be yes, and being played with a constant volume if it is determined to be no.

9. The television volume control method according to claim 8, wherein in the process of the automatic volume control mode, the volume output by the television is decreased below 15 dB if no one is watching the television.

10. The television volume control method according to claim 9, wherein the preset value is larger than or equal to 5 dB.

11. The television volume control method according to claim 8, wherein the preset value is larger than or equal to 5 dB.

12. The television volume control method according to claim 1, wherein in the process of the automatic volume control mode, the volume output by the television is decreased below 15 dB if no one is watching the television.

13. The television volume control method according to claim 12, wherein the preset value is larger than or equal to 5 dB.

14. The television volume control method according to claim 1, wherein the preset value is larger than or equal to 5 dB.

15. A television volume control system, comprising:

an acquiring unit operative to acquire a system time when a television receives a turn-on instruction and works in a mutely turn-on mode;

a first determining unit operative to determine whether the acquired system time is within a preset rest time period or not;

a turning on unit operative to turn on the television mutely if it is determined that the system time is within the preset rest time period, and to turn on the television normally if it is determined that the system time is not within the preset rest time period the television volume control system further comprising:

a camera apparatus operative to capture a picture in front of the television in real time after the television is turned on and works in an automatic volume control mode;

an identification unit operative to identify the picture captured by the camera apparatus to determine whether there is someone watching the television or not;

a sound sensor operative to capture a surrounding sound;

a second determining unit operative to determine whether a volume output by the television exceeds a volume of the surrounding sound by a preset value or not; and a volume control unit operative to decrease the volume output by the television if no one is watching the television, and to adjust the volume output by the television until the volume by which the volume output by the television exceeds the volume of the surrounding sound reaches the preset value, if there is someone watching the television and a determination result of the second determining unit is no.

16. The television volume control system according to claim 15, further comprising:

a mode entering unit operative to determine whether to enter the mutely turn-on mode or not, based on a user-input instruction or on a user's presetting, after the television receives the turn-on instruction and before the television enters the mutely turn-on mode; and further operative to determine whether to enter the automatic volume control mode or not, based on a user-input instruction or on a user's presetting, after the television is turned on and before the television enters the automatic volume control mode.

* * * * *